3,156,702
METHOD OF PRODUCING VINYLENE CARBONATE

Horst Höfermann and Hermann Springmann, Recklinghausen, Germany, assignors to Chemische Werke Hüls Aktiengesellschaft, Marl, Kreis Recklinghausen, Germany
No Drawing. Filed Mar. 27, 1962, Ser. No. 182,953
Claims priority, application Germany Mar. 28, 1961
7 Claims. (Cl. 260—340.2)

This invention relates to a novel process for the production of vinylene carbonate.

Vinylene carbonate is represented by the following formula:

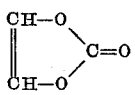

This compound can be produced by dehydrochlorinating monochloroethylene carbonate in an ether solution with the addition of tertiary amines as set forth in U.S. Patent 2,918,478. However, the product obtained by this process is relatively expensive to produce and furthermore it is difficult to purify the product.

Another method for producing vinylene carbonate is disclosed in the Journal of Organic Chemistry, 25, 1042 (1960), wherein monochloroethylene carbonate is dehydrochlorinated at high temperatures in the vapor phase, and in the presence of a catalytic quantity of anhydrous calcium sulfate or calcium chloride. This process, also, is relatively uneconomical inasmuch as the yields of final product are comparatively low and the catalyst employed loses its activity rapidly.

The object of this invention, therefore, is to provide a novel process resulting in comparatively high yields.

Another object is to provide a process wherein the catalyst maintains its activity over a relatively long period of time.

Upon further study of the specification and appended claims other objects and advantages of the present invention will become apparent.

To attain the objects of the present invention, a process is employed comprising the essential step of the catalytic dehydrochlorination of monochloroethylene carbonate in the vapor phase, utilizing as the catalyst an element or compound thereof belonging to sub-group I, or the sub-group of Group II, or sub-group VIII of the Mendeléeff Periodic Table. In particular, salts and oxides of these elements are preferred.

The starting material monochloroethylene carbonate, is prepared by the conventional process of chlorinating ethylene carbonate.

With respect to the catalysts of this invention, the specific preferred elements which can be beneficially employed are copper, zinc, nickel and cobalt. Particularly preferred are cadmium and iron.

Of the specific catalysts as foregoing described it is preferred to employ the halogenides of iron, or cobalt, or copper, or cadmium, the latter being particularly advantageous. Particularly preferred are the chlorides of said metals. It is to be noted that the valence of these chlorides is at their highest value.

The catalytic material may be applied onto the carrier by any conventional method, such as immersing the carrier in a suspension or solution of the catalytic material, and drying the resultant mass. Though a carrier is not necessary, the selection of the carrier substance is important. As preferred carrier substance there can be employed granular pumice of Italian origin, coke having a preferred particle size of 4.8 mm., and Stuttgart mass (a silicate containing small amounts of the oxides of natrium, iron, calcium and magnesium; cf. "Filtros," commercial product of Filtrol Company, Rochester, New York, U.S.A.).

In general the catalytic material is effective even in very minor concentrations. Of course, for the reaction to proceed in accordance with this invention, it is necessary to employ a catalytic quantity of the catalyst material on a carrier substance. It is preferred, however, to employ the catalytic material in a ratio of about 0.2–0.5 gram-mole to about 1 liter of granulated carrier.

On the other hand, it is possible, though expensive, to conduct the process of this invention without carrier.

The reaction temperature to be employed in this invention is in the range of 270 to 450° C., preferably 300 to 400° C.

Of course this reaction can be conducted in a continuous or batchwise manner, the continuous process being preferred.

A particularly preferred continuous process comprises evaporating monochloroethylene carbonate, and then passing said raw material through a heated reaction zone filled with the catalyst. It is preferred to dilute the monochloroethylene carbonate with a gas inert to the reactants and final products, e.g., nitrogen or carbon dioxide. The mole ratio of monochloroethylene carbonate to the inert gas is preferably 100 moles of monochloroethylene carbonate to 5 to 50 moles of inert gas.

When the process of this invention is conducted in a continuous manner, it is preferred to start the process by heating the catalyst to a relatively low temperature, e.g., 300° C., conducting the reaction at said temperature, and then as the reaction is continued, the reaction temperature is gradually raised to approximately 400° C. within ten to twenty days. The incremental increase in temperature per day is based on that temperature which yields the highest conversion rate of the raw material to vinylene carbonate (the conversion rate may be measured by the weight of the condensate from the product or from the quantity and composition of the uncondensed product gas).

An important advantage of the present invention is that the catalysts employed therein can be utilized for about 300 hours on the average. This duration of catalyst life amounts to approximately 6600% increase over the prior art catalysts which are exhausted after a reaction time of about 4½ hours. Furthermore, the catalysts of the present invention can be easily regenerated by heating them in an oxidizing atmosphere such as air, at 500 to 700° C. for a period of about to 30 hours.

The reaction is preferably conducted at atmospheric pressure, although it can also be conducted under vacuum conditions or at super-atmospheric pressure.

After the reaction products are discharged from the reaction chamber they are condensed and then resolved by a conventional chemical engineering unit operational step such as fractional distillation. The unreacted monochloroethylene carbonate can then be recycled to the reaction chamber. The waste gas, comprising hydrochloric acid, carbon dioxide, and any inert gas introduced at the beginning of the reaction, is treated in the usual manner depending upon the need for acid materials.

With respect to the reaction times for the conversion of monochloroethylene carbonate, in general a time of 5 seconds to 50 seconds will yield economically satisfactory results. It is preferred, however, that reaction times of 20 seconds to 30 seconds be observed. With respect to the minimum reaction time for the operability of this process, it is to be appreciated that a finite reaction time will yield a finite conversion rate.

It is believed that the foregoing description of this invention is sufficient for one skilled in the art to practice it without further instructions. However, to assist one skilled in the art even further, the following preferred specific embodiments are submitted. In this connection it is to be noted that the following examples are not to be construed as limitative in any way whatsoever of the specification taken as a whole, and the appended claims.

*Example 1*

500 ml. of catalyst are prepared from pumice of Italian origin having a particle size of 4–5 mm. which is impregnated with a solution of 20 g. of cadmium chloride monohydrate, and the mass is then dried. The catalyst is then filled into a reaction tube of stainless steel having a diameter of 30 mm. and a length of 1200 mm. 75 g. (0.61 mol) of monochloroethylene carbonate and 2–5 liter of nitrogen are led through the heated reaction tube within one hour. The reaction temperature is 300° C. at the beginning of the reaction and is gradually increased to 395° C. The temperature is increased in such a way that the monochloroethylene carbonate exchange is as complete as possible. After a throughput of 20.3 kg. (165 mols) corresponding to a period of 270 hours, the catalyst is regenerated by heating to 500–700° C. in an air stream.

The liquid leaving the reaction chamber containing vinylene carbonate, unreacted monochloroethylene carbonate and chloroacetaldehyde, is cooled and subsequently separated by means of fractional distillation under reduced pressure. The vinylene carbonate passes over at 52° C. and at a pressure of 8 mm. Hg.

The average conversion of monochloroethylene carbonate is 87%; the yield of vinylene carbonate is 74% related to reacted monochloroethylene carbonate. Moreover, 18% of chloroacetaldehyde are obtained.

*Example 2*

Example 1 is repeated except that cadmium chloride is replaced by iron chloride, similar results being obtained.

*Example 3*

Example 1 is repeated, except that cadmium chloride is replaced by cobalt chloride, similar results being obtained.

*Example 4*

Example 1 is repeated, except that cadmium chloride is replaced by copper chloride, similar results being obtained.

By employing the same process conditions as in Example 1, and replacing the catalyst, it is possible to employ with advantage the catalysts described generically and specifically in the description of the invention.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

*Example 5*

Example 1 is repeated, except that cadmium chloride is replaced by cadmium chips.

*Example 6*

Example 1 is repeated, except that cadmium chloride is replaced by cadmium oxide.

*Example 7*

Example 1 is repeated, except that cadmium chloride is replaced by cadmium iodide.

*Example 8*

Example 1 is repeated, except that cadmium chloride is replaced by iron chips.

What is claimed is:

1. A process for the production of vinylene carbonate which process comprises contacting gaseous monochloroethylene carbonate at 270–450° C. with a catalyst consisting essentially of a member of the group consisting of copper, zinc, cadmium, iron, cobalt, nickel and halogenides and oxides thereof.

2. The process of claim 1, wherein the reaction temperature is 300–400° C.

3. The process of claim 1, wherein the catalyst consists essentially of cadmium chloride.

4. The process of claim 1, wherein the catalyst consists essentially of iron chloride.

5. The process of claim 1, wherein the catalyst consists essentially of copper chloride.

6. The process of claim 1, wherein the catalyst consists essentially of cobalt chloride.

7. The process of claim 1, wherein the process is continuous and at the start of the process the reaction temperature is about 300° C., and within 10–20 days, the reaction temperature is gradually raised to about 400° C.

References Cited in the file of this patent

UNITED STATES PATENTS

| | | |
|---|---|---|
| 2,918,478 | Newman | Dec. 22, 1959 |
| 3,020,290 | Moss | Feb. 6, 1962 |
| 3,021,340 | Anderson | Feb. 13, 1962 |
| 3,030,382 | Patton | Apr. 17, 1962 |

FOREIGN PATENTS

| | | |
|---|---|---|
| 807,501 | Great Britain | Jan. 14, 1959 |

OTHER REFERENCES

Hartmann: "Chemical Abstracts," vol. 51, page 7051b (1957).

Roncero: "Chemical Abstracts," vol. 52, page 15926e (1958).